3,501,315
CYCLOHEXYLSULFAMIC ACID AS A TASTE IMPROVER FOR RAW POTATO PRODUCTS
Albin Joseph Slakis, Hinsdale, and Wayne Kenneth Kuhr, Waukegan, Ill., and Richard Lawrence Hughes, Roxbury, and Anne Josephine Neilson, Cambridge, Mass., assignors, by direct and mesne assignments, to Abbott Laboratories, North Chicago, Ill., a corporation of Illinois
No Drawing. Continuation-in-part of application Ser. No. 418,873, Dec. 16, 1964. This application July 12, 1968, Ser. No. 744,334
Int. Cl. A23l *1/12, 1/26*
U.S. Cl. 99—100                                                   1 Claim

ABSTRACT OF THE DISCLOSURE

The addition of a subthreshold level of cyclohexylsulfamic acid to a potato product significantly improves its texture and improves its flavor.

RELATIONSHIP TO OTHER APPLICATIONS

This application is a continuation-in-part of U.S. Ser. No. 418,873 filed Dec. 16, 1964, now abandoned.

DESCRIPTION OF THE INVENTION

The present invention relates to a method of improving flavor and texture of edible potato products; more particularly, it is concerned with enhancing the natural flavor and masking the starchy texture of potato products. For the purpose of this application, the term "potato products" refers to French fried potatoes, potato chips, potato sticks, mashed potatoes, boiled or baked potatoes, home-fried potatoes, au-gratin potatoes, Delmonico potatoes, canned potatoes, potato puffs, reconstituted instant potatoes, and any other form of a food preparation which is primarily and essentially based on potato origin.

Potato products are an essential nutritional element in the daily food of most people; they are consumed in large quantities but, unfortunately, because they have only a low level of flavor, the consumer often gets the undesirable feeling of starchiness on the tongue when eating these products. By adding various spices, the flavor of these products can be improved and altered, but only minimal improvements are obtained over the starchy mouth-feel, unless large amounts of additives are employed.

It is the main object of the present invention to provide a method for improving the flavor and simultaneously decreasing the starchy texture of edible potato products. It is another object of the present invention to improve the natural flavor and reduce the starchiness of potato products by the addition of a specific flavor enhancer in such a low concentration that the taste of said flavor enhancer is not, or only barely detectable in the final edible product prepared in this manner. It is a further object of this invention to reduce starchiness in potato products and to bring out the natural potato identity.

These and other objects are accomplished by adding between 0.005% and 0.01% by weight of cyclohexylsulfamic acid to an edible potato product before, during, or after heat processing said potato product. The term "heat processing" is meant to include the baking, boiling, and frying done by commercial food processors or by the housewife, regardless of the heat source.

The amount of cyclohexylsulfamic acid recited above is so small that its own taste is not detectable by the average consumer. Actually, the above specified range is very close to the threshold levels of cyclohexylsulfamic acid as determined by trained and experienced tasters when the latter is tasted in distilled water or spring water; the acid and sweetness perception of cyclohexylsulfamic acid in water starts at about 0.008% by weight, but this figure is considerably higher when the medium is other than water. A potato product of the above description treated in accordance with this invention will not produce the usual sensation of sourness or sweetness which would be expected by the addition of cyclohexylsulfamic acid since the threshold of the latter is considerably above that level when measured in such foods. Instead, the natural flavor of the potato products so treated is strongly enhanced and surprisingly, the starchy texture of these foods is improved to such a degree that the common objectionable starchiness is significantly reduced or entirely overcome. In many cases, it is even noted that the product-related natural sour taste is reduced with the addition of cyclohexylsulfamic acid and, where fried products are concerned, the oxidized oil characteristic usually associated with fried foods is markedly reduced. Further, the final fried products retain their crispness for a longer period of time than similarly produced fried potatoes, potato sticks or chips prepared without cyclohexylsulfamic acid.

For the evaluation used in the description of the flavor and texture of the potato products sampled below, the "Flavor Profile Analysis" method established by Arthur D. Little, Inc. and published in "Flavor Research and Food Acceptance" (Reinhold Publishing Corporation, New York 1968, pages ff.) and a highly experienced taste panel were used. The improvements obtained by the method of this invention include one or more of the following characteristics: increase in flavor, better blending or covering of such character notes as starchy, metallic and/or bitter, and improved mouth-feel or texture. When cyclohexylsulfamic acid is added within the limits shown above, no significant changes are observed in sweetness and sourness over untreated control samples of the potato products tested. Thus, it appears that the amount of cyclohexylsulfamic acid added has an effect on the described potato products similar to that produced by the addition of monosodium glutamate in certain meat products, e.g., the additive cannot be identified by its taste, yet it produces enhancement of the natural flavor characteristic to such a product and reduces some of the undesirable texture notes.

EXAMPLES

An amount of 0.5 g. of cyclohexylsulfamic acid was added to 500 ml. of a frying oil and 100 g. of raw potatoes cut into prisms of standard French fries size were fried in this mixture for eight minutes. The taste panel compared the finished French fries with control samples prepared in the identical manner but without the addition of cyclohexylsulfamic acid. The control sample had a mealy, raw texture while this raw-potato note was significantly reduced in the test samples which furthermore had a more pronounced, pleasant, fried note without added sweetness.

In similar manner, frozen fried potatoes were prepared by using 0.005%, 0.01%, 0.02% and 0.03% by weight of cyclohexylsulfamic acid in the frying oil for a 100-gram sample of cut potato prisms. The taste panel determined a definite reduction of the rancid oil note apparent in control samples prepared in the same fashion but without the additive; the test samples also were less starchy and tasted more like freshly prepared French fries. However, the test samples using 0.02 and 0.03% of cyclohexylsulfamic acid showed a sweetness detectable on the surface. Identical findings are observed when the cyclohexylsulfamic acid is added to the dough from which the prisms are extruded.

In similar fashion, potato chips were prepared using 0.0025%, 0.005% and 0.01% by weight of cyclohexylsulfamic acid. The samples containing 0.005 and 0.01% of the additive show substantially reduced rancidity and good fried potato identity; the sample with 0.0025% of the additive shows some flavor changes but these were not regarded as resulting in substantial texture improvement. Levels above 0.01% also show texture improvement but were found to be on the sweet side. After allowing the control and the test samples to stand unprotected in the open for 72 hours, the test samples still show most of their initial crispness and taste, while the control samples have a typical stale, soggy taste with greatly reduced crispness.

In a similar test, Borden's® whipped instant potatoes were prepared according to the label instructions, using 0% (control), 0.005 and 0.01% of cyclohexylsulfamic acid as an additive in the preparation. The test samples showed a definite taste improvement with a clear reduction of the undesirable starchiness and suppressed casein taste. Higher levels of the additive showed similar improvement but sweetness was detectable above 0.01% of the additive. Similar improvements are found when the cyclohexylsulfamic acid is added to the potato slurry from which the dried potato product is prepared.

Similar results were observed by comparing French's® instant mashed potatoes using 0.01% by weight of cyclohexylsulfamic acid as an additive during the preparation thereof with a control sample containing no additive: the test sample showed less casein taste, had a fuller flavor and provided a slight buttery impression and slightly more seasoned than the control sample. When the cyclohexylsulfamic acid is added in the process of making the above "instant" powder, the same improvements are observed.

Similar improvements in taste and texture were also observed by using 0.01% by weight of cyclohexysulfamic acid in the preparation of fresh mashed potatoes, fresh baked sweet potatoes and canned white potatoes; the additive may be introduced into the mix from which a processed form of a potato product is prepared or at the time of preparing the final edible form. With the white potato, the test sample was less starchy and less salty than the control sample; the test sample of sweet potatoes showed no root or skin aromatics on the tongue and the taste was more blended; the fresh mashed potatoes showed a more pronounced potato identity and were less earthy than the control samples.

As will be seen from the above examples, the addition of 0.005–0.01% by weight of cyclohexylsulfamic acid significantly reduces the starchy flavor and texture of the above defined potato products as compared to the same products prepared identically but in the absence of cyclohexylsulfamic acid. The new process enables the natural flavor of the defined products to become more characteristic and pronounced and it removes the starchy mouthfeel so often objected to in items like mashed potatoes or frozen French fries. Surprisingly, the addition of these extremely small quantities of cyclohexylsulfamic acid decreases or removes the unpleasant feel of texture without contributing its own integers of taste, while creating more flavor-body in the described potato products.

The amount of cyclohexylsulfamic acid specified above provides a simple guideline for reducing the starchy feel and enhancing the flavor by the present method. It is to be understood that these amounts of cyclohexylsulfamic acid are to be calculated on the amount of the dry basis of the raw potato or reconstituted potato mix, i.e., prior to the heat processing required in all instances. When cyclohexylsulfamic acid is used at a level below 0.005% by weight, the desired texture improvement is not significant enough to be detectable by the average consumer; and when the amounts used are above 0.03%, some consumers may perceive the taste of cyclohexylsulfamic acid itself. In other words, the defined amount of cyclohexylsulfamic acid provides a universally-acceptable flavor enhancement without imparting to the potato product the sour-sweet taste of the acid itself, even when tasted by the more sensitive consumer. The amount specified may be added to the processing medium, e.g., to the frying oil when frying potatoes, or to the mix, e.g., in mashed potatoes or reconstituted whipped potatoes; or the required amount may be mixed into the consumer-ready product just prior to serving, i.e., after heat processing such as by mixing the determined amount into mashed potatoes or by sprinkling the required amount over French fries or home-fried potatoes, potato chips, potato sticks and similar products based on potato origin. The exemplified and described taste and texture improvement is common to all potato products and, where the potato product has been modified by the addition of spices, butter, cheese, etc. the flavor of the additive used is enhanced by the present process. In short, any kind of a food product which is mainly based on a potato origin is substantially improved in taste and texture by the addition of between 0.005% and 0.01% by weight of the final edible composite.

We claim:

1. The process of adding between 0.005% and 0.01% by weight of cyclohexylsulfamic acid to raw potatoes before, during or after frying said potatoes, said amount of cyclohexylsulfamic acid being calculated on the dry basis of said potato.

References Cited

UNITED STATES PATENTS 2,876,106  3/1959  Jucaitis et al. _____ 99—141

MAURICE W. GREENSTEIN, Primary Examiner

H. H. KLARE III, Assistant Examiner

U.S. Cl. X.R.

99—140, 141, 207